United States Patent [19]

Macierewicz et al.

[11] 4,163,719
[45] Aug. 7, 1979

[54] HYDROCYCLONE SEPARATOR ARRANGEMENT

[75] Inventors: Jacek J. Macierewicz; Johannes J. Richters; James E. St. John, all of Calgary, Canada

[73] Assignee: Elast-O-Cor Products & Engineering Limited, Canada

[21] Appl. No.: 831,283

[22] Filed: Sep. 7, 1977

[30] Foreign Application Priority Data

Jan. 26, 1977 [CA] Canada .................................. 270494

[51] Int. Cl.² ............................................ B01D 21/26
[52] U.S. Cl. ...................................... 210/84; 209/144; 209/211; 210/512 R
[58] Field of Search ...................... 210/84, 304, 512 R, 210/512 M; 55/456, 457; 209/144, 211

[56] References Cited

U.S. PATENT DOCUMENTS

| 1,809,375 | 6/1931 | Chase | 55/457 |
| 1,970,077 | 8/1934 | Collins | 55/457 |
| 3,386,588 | 6/1968 | Ades | 55/457 |
| 3,800,946 | 4/1974 | Reid et al. | 210/84 |
| 3,940,331 | 2/1976 | Rastatier | 210/512 M |
| 4,019,980 | 4/1977 | Beery | 210/512 M |

Primary Examiner—Frank Sever
Attorney, Agent, or Firm—Stevens, Davis, Miller & Mosher

[57] ABSTRACT

Improved hydrocyclone separators are adapted for connection to an improved header having concentrically arranged feed and accept nipples. The hydrocyclone includes feeding means including unique guide vane means for swinging the feed suspension from a generally longitudinal direction to a generally spiral direction and accelerating same prior to feeding the suspension into the separation chamber. The accept outlet includes an elongated tubular member with the guide vanes being located in the annular region defined between the tubular member and the wall of the chamber. The wall of the separator chamber terminates at the large end thereof at an annular rim the latter being connected to the feed nipple. The elongated tubular accept outlet has an end portion concentrically arranged relative to the annular rim of the separator chamber for connection to the accept nipple which is concentrically arranged relative to and within the feed nipple. The system operates efficiently at relatively low feed pressures, is simple in construction, easy to service and operate and can be arranged to occupy minimal floor space.

9 Claims, 11 Drawing Figures

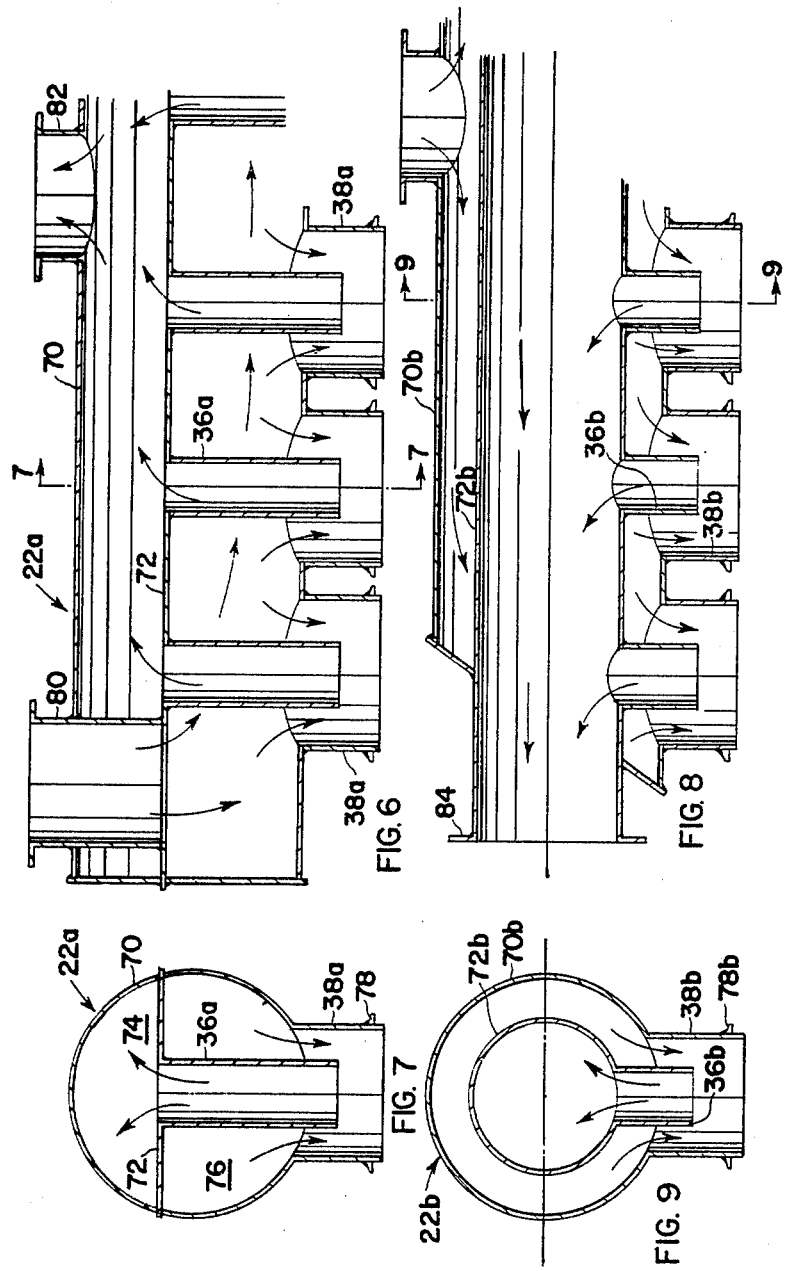

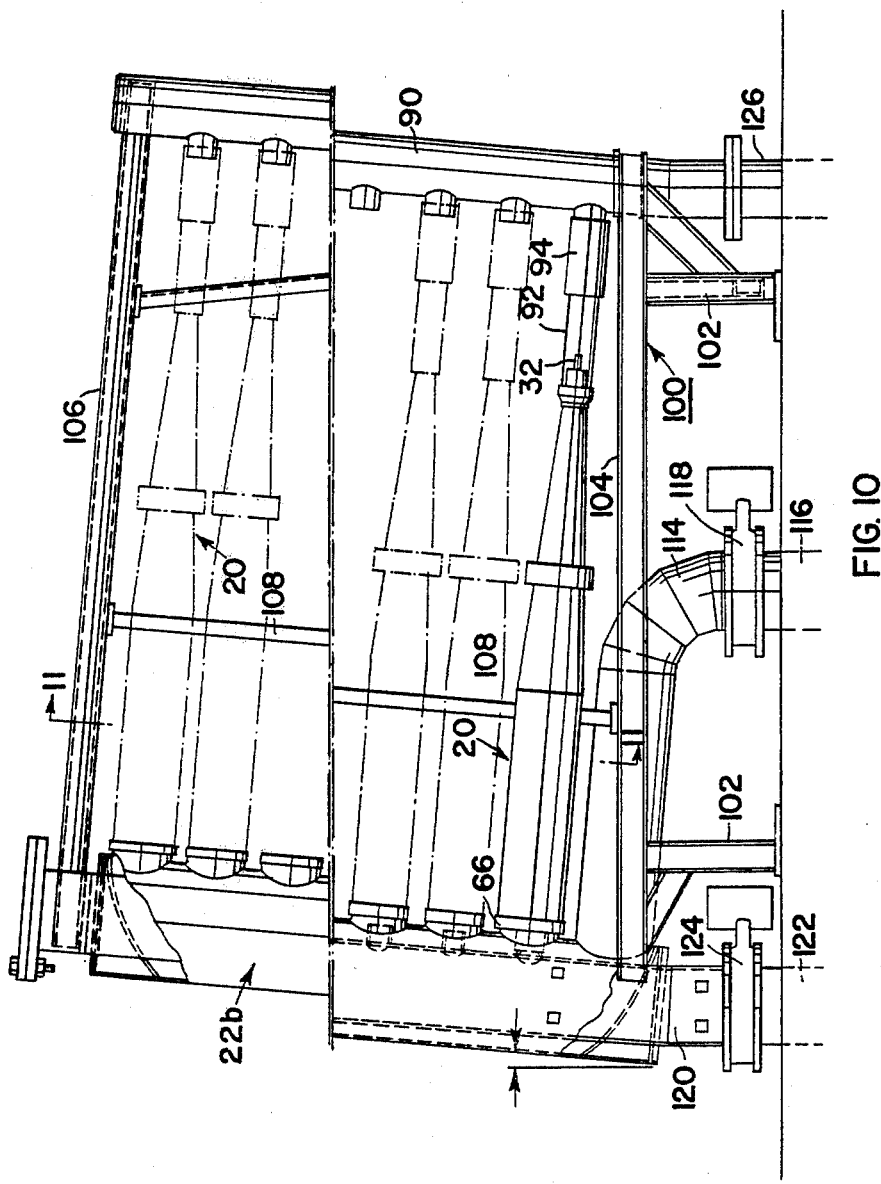

HYDROCYCLONE SEPARATOR ARRANGEMENT

This invention relates to improved methods and apparatus for separating or fractionating liquid suspensions by means of hydrocyclones.

Hydrocyclones have been in use for a number of years in various fields as for example, the pulp and paper industry, and have been found useful for removing certain impurities, such as shives, bark, and grit, and other forms of dirt of a character unsuited for removal from the pulp by screening processes.

The overall construction and manner of operation of hydrocyclone separators is well known. A typical hydrocyclone includes an elongated chamber (e.g. conical) of circular cross-section which decreases in cross-sectional size from a large end to a small or apex end. A "reject" outlet for the heavy fraction is provided at the apex of the conical chamber while the lighter or "accept" fraction of the suspension exits through an axially arranged accept outlet at the opposite end of the conical chamber. The pulp suspension is introduced into the chamber via one or more tangentially directed inlets adjacent the large end of the chamber thereby to create a fluid vortex therein. The centrifugal forces created by the vortex throw the heavier particles of the suspension outwardly toward the wall of the conical chamber thus causing a concentration of solids adjacent thereto while the lighter particles are brought toward the center of the chamber and are carried along by an inwardly located helical stream which surrounds an axially disposed "air core". The lighter fractions are thus carried outwardly through the accept outlet. The heavier particles continue to spiral along the interior wall of the hydrocyclone and eventually pass outwardly via the reject outlet.

The fluid velocities within the hydrocyclone are quite high and the dynamic forces thus produced are sufficiently high that gravitational forces usually have a negligible affect on the performance of the device. Thus, the hydrocyclones may be oriented in various ways e.g. horizontally, vertically, or obliquely while maintaining satisfactory performance. The hydrocyclones are commonly arranged in large banks of several dozen or even several hundred hydrocyclones with suitable feed, accept, and reject headers or chambers arranged for communication with the feed, accept, and reject openings respectively of the hydrocyclones.

Earlier separator systems involving large numbers of hydrocyclone separators commonly employed a rather complex system of feed, accept, and reject pipes or conduits which, of necessity, occupied a very substantial amount of floor space and which required relatively costly and complex support structures for the relatively costly and complex piping systems involved. Furthermore, the piping systems involved gave rise to substantial fluid pressure losses, thus requiring higher feed pump operating pressures which resulted in a relatively high consumption of energy during operation of the systems.

In an effort to alleviate a number of these problems, certain innovators, such as Wikdahl in Sweden, developed circular canister arrangements containing multiple hydrocyclones. The hydrocyclones were supported in vertically spaced apart layers, with the hydrocyclones of each layer being disposed in radially arranged arrays with common feed, accept, and reject chambers communicating with the hydrocyclones in the several layers. One basic object of this arrangement was to save on the floor space area required for the hydrocyclones above the equipment floor while the feed, accept and reject collection piping was installed beneath the floor together with the necessary valves on each unit for adjusting pressures and for isolating individual "canister". This form of system did save space but there were a number of disadvantages in that the operation of individual hydrocyclones could not be observed; thus, if one or more hydrocyclones became plugged during operation, the operator had no way of detecting such plugging until the efficiency of the entire unit was decreased sufficiently as to call for a shut-down of that unit and disassembly of same thereby to allow the defective hydrocyclones to be removed and replaced. Furthermore, access to the various valves and pressure gauges for each unit was awkward because they were all located under the equipment floor and a special walkway was required under the floor to enable the operator to have access to such valves and gauges. These systems were also operated with reject pressures above atmospheric and it was required that they be adjusted with accuracy in order to control the operation of the cleaner since the cleaners are very sensitive to the difference in pressure between the accept and reject openings.

More recently, alternative forms of modular hydrocyclyone separator systems have been devised in an effort to overcome the above noted problems with the "canister" system. These new systems involve vertically disposed, suitably spaced feed, accept, and reject headers. The individual hydrocyclones are connected to these headers and are positioned in generally vertical planes in substantially horizontal positions, one above the other. Thus, operator control of the cleaning system is facilitated and the operation of individual hydrocyclones can be observed. However, while the above noted "canister" systems did permit operation at reduced feed pressures due to the elimination of some of the pressure losses caused by the feed piping arrangements of conventional systems, the above noted modular system employing vertically disposed, separate accept, feed, and reject headers, still suffers from the disadvantages inherent in the older systems insofar as pressure losses are concerned. The hydrocyclones used with these systems all employ a single tangential feed entry and, in common with the older prior art systems, have a built-in pressure loss at the point where the feed stock turns from the feed header into the individual feed inlet pipes for each hydrocyclone, and also along the lengths of the feed inlet pipes, and also on entry into the separation chambers of the individual hydrocyclones. In addition, there is a loss of pressure at the points where the accept stock from the hydrocyclones enters the accept header from the accept pipes associated with each hydrocyclone. Thus, in order to obtain the cleaning efficiency desired, these later forms of modular cleaning systems, in common with the earliest systems, typically require stock feed pressures in the feed header in the order of 40 pounds per square inch gauge, whereas the above noted canister systems required feed pressures of much lower magnitude since they did not require the complex feed inlet pipes for each individual hydrocyclone as in the other systems noted above.

It is a general object of the present invention to provide improvements in hydrocyclones and in hydrocyclone systems, which incorporate the advantages noted above in connection with the later forms of modular cleaning systems as well as providing the low pressure operating characteristics inherent in the "canister" cleaning systems.

The present invention thus involves, among other things, improved hydrocyclone separators per se, particularly improvements in the feed and accept regions of same, improved methods of separating suspensions in such hydrocyclone separators, improvements in the feed and accept header arrangements for supplying groups of such hydrocyclones, and improved separator systems comprising hydrocyclone separators in accordance with the invention in combination with the improved feed and accept header arrangements provided by the invention.

Thus, an object of one aspect of the invention is to provide an improved hydrocyclone separator capable of operating at low inlet feed pressures while at the same time having a throughput capacity and cleaning efficiency comparable to that of a conventional hydrocyclone operating under otherwise similar conditions.

Thus, the present invention in one aspect relates to hydrocyclone separators of the type including a body having a wall defining an elongated chamber of generally circular cross-section and shaped such that it decreases in cross-sectional size from a large end to a smaller apex end, a reject outlet at the apex end and an accept outlet at the large end, both being located in axial alignment with said chamber, and means for feeding a liquid suspension generally tangentially into said chamber whereby to form a liquid vortex in said chamber surrounding a central air core extending longitudinally of the chamber.

This aspect of the invention is particularly characterized in that the means for feeding the liquid suspension is arranged to receive the feed suspension in a path of travel directed generally longitudinally of the chamber, the feeding means including guide vane means defining: (a) a transition section for gradually swinging said suspension from motion in the generally longitudinal direction to the form of a spiral around the chamber axis while gradually accelerating the suspension, and (b) a helical section connected to said transition section and arranged to cause the suspension to rotate around the chamber axis to impart centrifugal and shear forces prior to feeding the suspension into the separation chamber.

The hydrocyclone is further characterized in that said accept outlet comprises an elongated tubular member with said guide vane means being located in the annular region defined between said tubular member and the wall of the chamber, said guide vane means extending from said tubular member to said wall of said chamber at the large end thereof.

In a preferred form of the invention, said guide vane means form a pair of channels for the suspension, the regions where said suspension exits from said channels being spaced apart circumferentially.

In accordance with a further feature of the invention, the channels defined by the guide vane means in the helical section are of substantially constant cross-sectional area along the length thereof. In a further feature of the invention, the channels defined by the guide vane means in the transition section are of decreasing cross-sectional area along the length thereof to effect the gradual acceleration of the suspension passing therethrough.

In a preferred form of the invention the helical section of the guide vane means is arranged to rotate the suspension through approximately one full revolution about the chamber axis. This sets up a vortex action which provides partial separation of heavy particles of the suspension outwardly to the wall of the chamber before the suspension actually enters into the separation chamber.

As an additional feature, the helical section of the guide vane means is arranged such that each of the channels defined thereby has a width defined by substantially the full distance between the tubular member and the inner wall of the hydrocyclone chamber.

In a preferred form of the invention, said elongated tubular member has a first portion at the one end thereof extending beyond said helical section into said chamber to define a vortex finder and a second portion at the opposite end thereof extending axially away from said chamber to provide for a connection to a tubular accept nipple.

The hydrocyclone separator according to the invention is designed to cooperate with a unique form of combined feed and accept header arrangement. Accordingly, in a preferred form of the hydrocyclone, said wall of the separator chamber terminates at the large end thereof at an annular rim, said annular rim being adapted for connection to a tubular feed nipple, and said elongated tubular accept outlet having an end portion concentrically arranged relative to said annular rim of the separator chamber and adapted for connection to a tubular accept nipple which is concentrically arranged relative to the feed nipple.

The method aspect of the invention includes the steps of passing the feed suspension into the separator in a path of travel directed generally longitudinally of the chamber and then gradually swinging said suspension from a generally longitudinal direction to a generally spiral direction while gradually accelerating the suspension, and then causing the suspension to rotate around the chamber axis to impart centrifugal and shear forces thereto prior to feeding the suspension generally tangentially into the separation chamber.

Preferably, the feed suspension is introduced into the separation chamber at a pair of locations spaced apart circumferentially of the chamber.

In a further feature, said suspension is caused to rotate about the chamber axis by about one full revolution whereby to induce heavier particles in the suspension to move radially outwardly to the wall of the chamber before the suspension enters into the separation chamber.

In a preferred form of the invention said suspension travels in helical paths which have a width generally equal to the distance between the accept outlet and the inside wall of the separation chamber at least at the region where said feed suspension enters the separation chamber.

In accordance with a separate aspect of the invention there is provided a hydrocyclone separator adapted for connection to concentrically arranged feed and accept nipples. The hydrocyclone includes feeding means including guide vane means for swinging said suspension from a generally longitudinal direction to a generally spiral direction prior to feeding the suspension into the separation chamber, and an accept outlet comprising an elongated tubular member with said guide vane means being located in the annular region defined between said tubular member and the wall of the chamber, and wherein said wall of the separator chamber terminates at the large end thereof at an annular rim, said annular rim being adapted for connection to a tubular feed nipple, and said elongated tubular accept outlet having an end portion concentrically arranged relative to said annular rim of the separator chamber and adapted for connection to a tubular accept nipple which is concentrically arranged relative to and within the feed conduit.

In a further feature said annular rim lies in a plane normal to the axis of said elongated chamber, said annular rim defining an annular seat thereon adapted to sealingly engage with the feed nipple. Preferably said annular rim has a radially outwardly extending lip thereon to enable said chamber to be connected to the feed nipple by means of a V-band clamp or the like.

A further object of the invention is to provide an improved feed and accpet header arrangement adapted for connection to a plurality of hydrocyclone separators of the character described above.

Thus, in accordance with a further aspect of the invention there is provided a combination feed and accept header adapted for connection to a plurality of hydrocyclone separators, said header comprising: an outer wall and a dividing wall therein to separate feed suspension from accept suspension; a plurality of tubular accepts nipples connected to said dividing wall in aligned spaced apart relation for fluid flow therethrough and adapted for connection to respective end portions of tubular accept outlets of the hydrocyclone separators; and a corresponding plurality of tubular feed nipples each surrounding a respective one of said accept nipples in spaced concentric relation therewith and connected to said outer wall for fluid flow therethrough and adapted to be connected to annular rim portions at the large ends of the respective separator chambers, whereby feed suspension can pass toward the separator chambers of the hydrocyclones through the annular spaces between said feed and accept nipples, and also to permit accept suspension to pass from each separator chamber through said accept nipple and through said dividing wall.

In a further aspect of the invention said outer wall of the header comprises a relatively large diameter pipe and said dividing wall comprises a plate separating the interior of the pipe into two regions.

In a still further aspect of the invention said outer wall comprises a relatively large diameter pipe and said dividing wall is in the form of a pipe located within the outer pipe with an annular space for feed suspension being defined therebetween.

In accordance with a further feature of this aspect of the invention, the above noted header is located either in a generally upright or horizontal position and a plurality of said hydrocyclone separators are connected to said header in spaced apart relation therealong, said separators being disposed one above or behind the other in a generally vertical plane and one end of each said separator being connected to its own feed nipple and accept nipple and a header or a trough for rejects disposed in spaced generally parallel relation to the first named header and connected to respective reject outlets at the opposite ends of each said separator.

The principles of the invention and the advantages associated therewith will be better understood from the following description of preferred embodiments of same with reference being had to the drawings wherein:

FIG. 6 is a longitudinal section view of one form of combined feed and accept header arrangement;

FIG. 7 is a cross-section view taken along line 7—7 of FIG. 6 and looking in the direction of the arrows;

FIG. 8 is a longitudinal section view of a further form of combined feed and accept header arrangement;

FIG. 9 is a cross-section view taken along line 9—9 of FIG. 8 and looking in the direction of the arrows;

FIG. 10 is a side elevation view of a modular cleaning system illustrating a series of hydrocyclone separators in accordance with the invention and connected to a combined feed and accept header arrangement and also to a the reject header arrangement;

Figure 1:
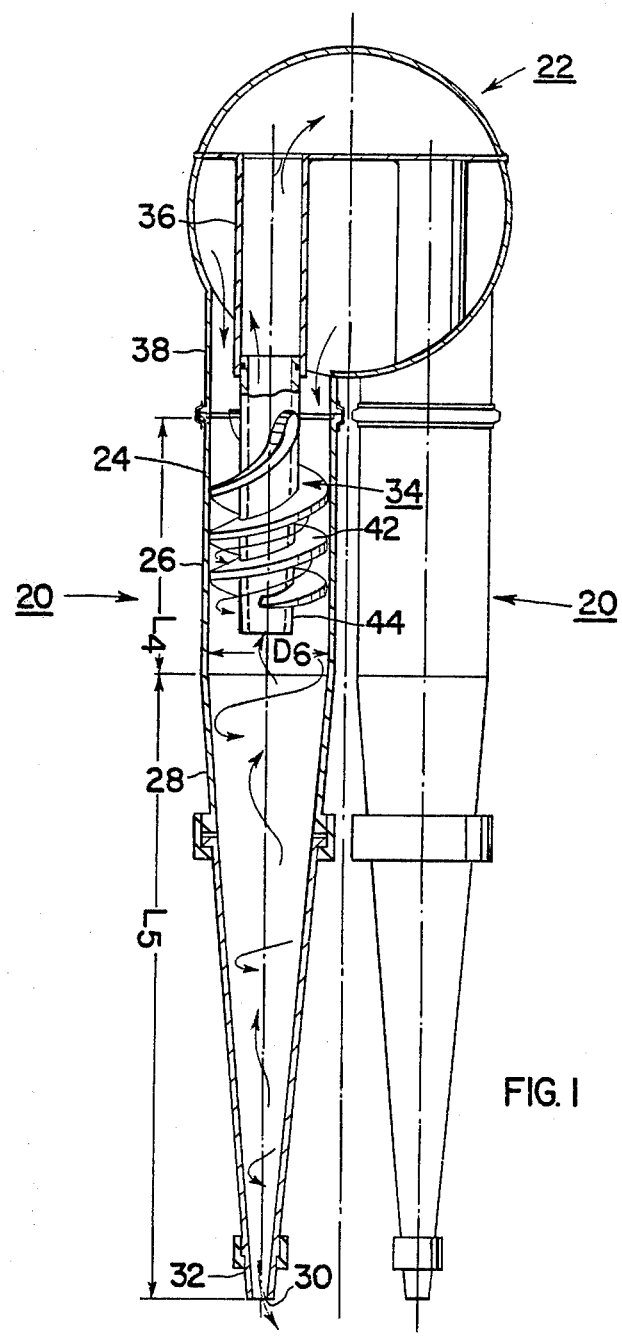
FIG. 1 is a view, partly in section, of a hydrocyclone separator in accordance with the invention and connected to a combined feed and accept header arrangement in accordance with a further feature of the invention.

With reference now to the drawings there is shown at FIG. 1 typical hydrocyclone assemblies 20 connected to a combined feed and accept header 22. The hydrocyclone 20 includes a wall 24 defining an elongated chamber of generally circular cross-section. This wall includes a generally cylindrical section 26 defining the large end of the hydrocyclone, which cylindrical wall portion is connected to a conical wall portion 28 which tapers generally uniformly down to reject outlet 30 at the apex of the conical portion, such reject outlet being defined by a tip portion 32. The wall of the reject outlet passage is preferably, but not necessarily, provided with spiral groove defining means of the type illustrated in U.S. Pat. No. 3,800,946 dated Apr. 2, 1974 and assigned to the assignee of the present invention.

An accept outlet and guide vane arrangement 34 is located within the large end of the hydrocyclone, i.e., within the cylindrical section 26 thereof. This assemby 34 communicates with an accept nipple 36 forming part of the feed and accept header 22 while the wall of the hydrocyclone 24 is connected at the large end thereof to a feed nipple 38 also forming a part of the above mentioned feed and accept header 22. A more detailed description of suitable forms of feed and accept headers in accordance with the invention will follow hereinafter.

The accept outlet and guide vane assembly 34 is adapted to introduce feed suspension generally tangentially into the elongated chamber defined by wall 24 thereby to provide a high velocity fluid vortex within such chamber with the heavier portions of the suspension passing downwardly and around the wall of the chamber and ultimately passing out of the reject outlet 30. The lighter fractions of the suspension move toward the axis of the hydrocyclone chamber and join an oppositely moving helical flow which surrounds an air core passing along the hydrocyclone axis with such lighter fractions ultimately passing outwardly of the hydrocyclone through the above noted accept conduit 36.

With reference now to FIGS. 2-5, it will be seen that the accept outlet and guide vane assembly 34 is disposed at the large end of the hydrocyclone separator 20 and within the cylindrical wall portion 26 thereof. The assembly 34 includes an elongated tubular member 40 having a pair of guide vanes 42 extending outwardly therefrom, with such guide vanes 42 being located in the annular space defined between tubular member 40 and the interior wall 45 of the separator chamber. The outermost edges of the guide vanes 42 contact the inner wall 45 of the chamber thereby to prevent by-pass of fluid therebetween. The assembly 34 is maintained in position within the hydrocyclone chamber by means of projections 35 formed on the outer extremity of each vane 42, which projections seat in corresponding recesses formed in the wall of the chamber at the large end thereof.

Figures 2, 3:
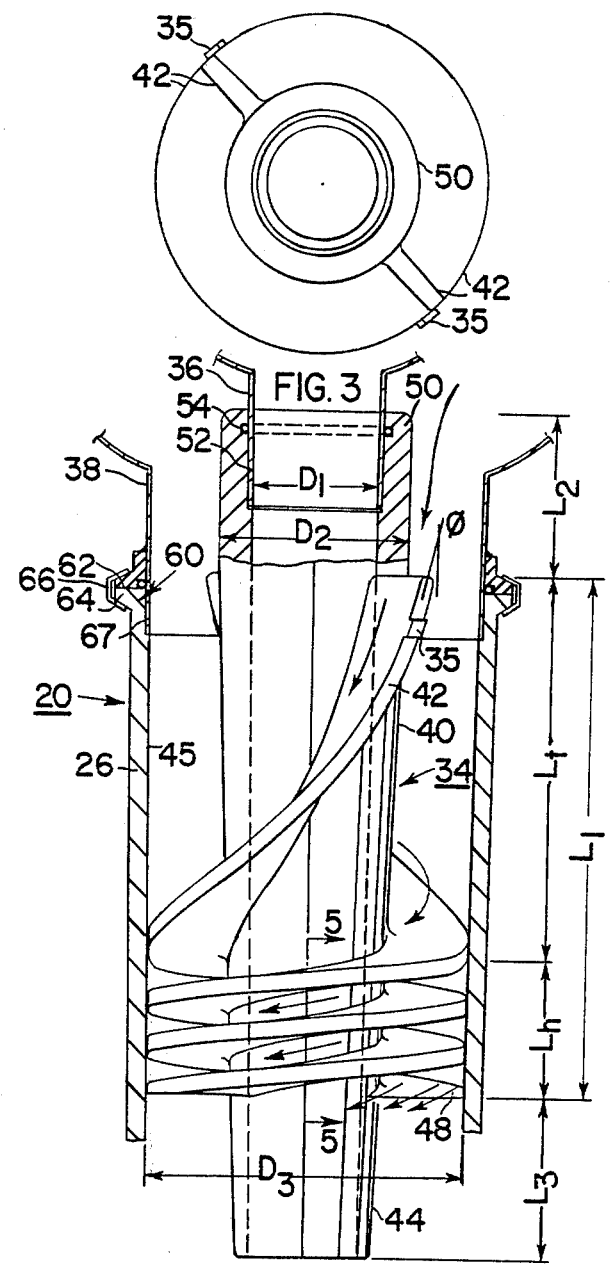
FIG. 2 is a longitudinal section view of the inlet feed portion of the hydrocyclone in accordance with the invention and illustrating the manner of connection of same to the combined feed and accept header arrangement.
FIG. 3 is an end elevation view of the combined accept outlet and guide vane arrangement.

The two guide vanes 42 each include two sections i.e., a transition section having a length $L_t$ as shown in FIG. 2 for gradually swinging the suspension from a generally longitudinal direction to a generally spiral direction while gradually accelerating the suspension, and a helical section having a length $L_h$ as shown in FIG. 2 arranged to cause the suspension to rotate around the chamber axis to impart centrifugal forces thereto prior to feeding the suspension into the separation chamber.

With continued reference to FIG. 2 it will be seen that the two guide vanes 42 are disposed at a relatively shallow angle e.g. 10° to the axis of the separator at the inlet end thereof with such angle gradually increasing to an angle of about 84° at the end of the transition section. The channels defined by the guide vanes 42 are initially of relatively large cross-sectional area. The guide vanes interfere in only a very minor way with the flow of the fluid. Since the two channels are of relatively large cross-section, a relatively low fluid velocity at the entry to the channels is maintained. The inlet vane angle of about 10° is considered reasonable for negligible pressure loss and, in this way, the axial length $L_t$ of the transistion section is maintained within reasonable limits. Furthermore, in the transition section, because of the change in the angles which the guide vanes 42 make with the axis of the separator, there is a gradual decrease in the cross-sectional area of such channels along the length thereof. This gradual reduction in cross-section and the gradual change of angle of the guide vanes 42 results in a transition from what is initially essentially axial flow to flow that is essentially in a spiral direction. This transition in flow direction and the acceleration of the fluid are achieved in a relatively smooth fashion thereby reducing friction and shock pressure losses.

Following the transition section, the suspension smoothly enters the helical section referred to above. In this section the guide vanes 42 are at a constant angle to the axis of the separator and define flow channels of substantially constant cross-sectional area along the length of same. This cross-sectional area is of course measured at right angles to the direction of the flow. The helical section is of sufficient length as to carry the fluid in each of the channels around the hydrocyclone axis by a substantial distance, preferably about one full revolution thus tending to develop a free vortex pattern in the suspension which had been previously accelerated in the transition channels. This rotational motion of the fluid provides for some separation or cleaning of the suspension under the influence of centrifugal and shearing forces so that on entering the separation chamber large particles have been preferentially vortexed outwardly toward the wall 45 of the chamber thus reducing their potential for "short circuit" flow down the outside and around the end of the vortex finder 44, the latter extending downwardly into the separation chamber for a desired distance beyond the terminal portion of the helical section of the guide vanes 42. By reducing the tendency for "short circuit" flow to occur, cleaning efficiency is increased.

Figure 4:
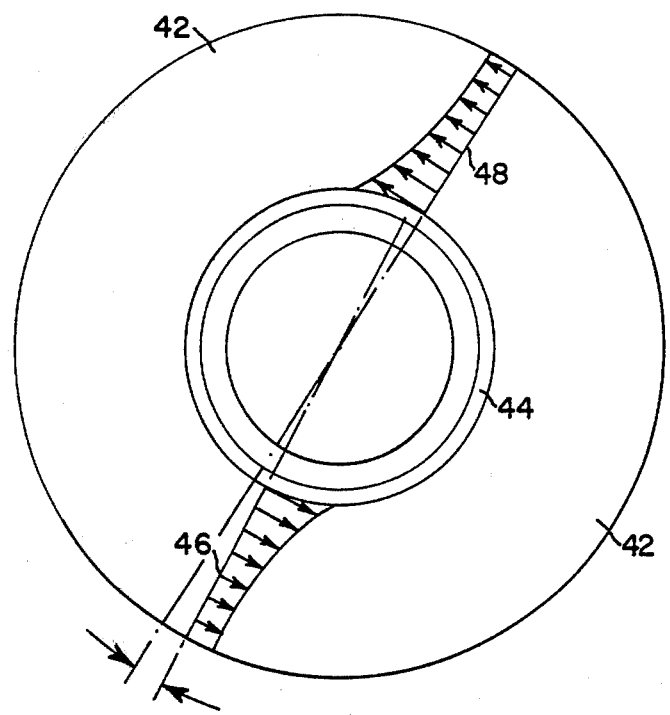
FIG. 4 is a view similar to FIG. 3 but showing the opposite end of the combined accept outlet and guide vane arrangement.

With reference to FIG. 4, which illustrates the exit portions 46 and 48 of the two channels formed by the guide vanes 42, it will be seen that the stock makes entry into the separation chamber across the full width of the annular space between the tubular vortex finder 44 and the interior wall of the separation chamber. This full annular entry is advantageous because:

(1) It further reduces the tendency for "short circuit" flow. (In conventional hydrocyclones wherein the fluid enters tangentially through one or more inlets in the side wall of the hydrocyclone, it has been shown that the stationary roof or top of the conventional hydrocyclone creates an obstruction to tangential flow with this obstruction causing a portion of the feed liquid to pass directly across the cyclone roof and down the outside wall of the vortex finder to join the accept flow within the vortex finder). By providing full annular entry, the "stationary roof" effect is substantially eliminated.

(2) the full annular entry also reduces shock losses of fluid on entering the separation chamber. In conventional hydrocyclones, shock losses occur as the result of the meeting of two flow streams having different velocity distributions i.e., the flow stream entering through the tangential inlet and the flow stream provided by the vortexing liquid within the chamber. With the present arrangement all of the fluid entering the separation chamber is already in rotation and is almost in a fully developed free vortex pattern and, thus, since it occupies the entire annular space between the vortex finder and the inside wall 45 of the separation chamber there will be minimal flow disturbance as it attains a fully developed free vortex-forced vortex pattern in the separation chamber.

It will also be noted with reference to FIGS. 3 and 4 that the opposed guide vanes 42 are not exactly diametrically opposed i.e., they are off-set slightly from diametral positions by a small angular amount which preferably is in the order of 5° or somewhat more. While this slightly offset arrangement is by no means essential, the slightly off-set arrangement shown is believed to possess certain advantages in that the feed pumps which feed the hydrocyclone usually tend to set up a small amount of pulsation in the fluid entering the hydrocyclone. If the channels defined by guide vanes 42 are exactly symmetrically arranged with the discharges 46 and 48 thereof in diametric symmetry, the resulting pulse at entry to the hydrocyclone will have the amplitudes of these fluid pulses. By arranging for the flow channels to be slightly asymmetric as shown in the drawings, the total pulsations so formed by the existence of these two pulsations will be decreased because they will be out of phase with one another and consequently the total amount of vibration of a bank of such hydrocyclones will be reduced somewhat.

With further reference to the accept outlet and guide vane assembly 34, it will be seen that the tubular portion 40 thereof includes a portion 50 extending outwardly of the large end of the hydrocyclone and providing a means for connection to the accept nipple 36 noted above. As shown in FIG. 2, in order to permit the accept nipple 36 to seat within the end of this tubular portion 50, the latter includes a radially outwardly stepped portion 52 with an annular groove 54 therein which serves to contain a resilient O-ring gasket thereby preventing leakage of fluids between tubular portion 50 of the accept outlet and the accept nipple 36.

The wall 26 of the separator chamber terminates at the large end thereof at an annular rim 60, the annular rim defining an annular seat 62 thereon adapted to sealingly engage with a similar form of rim on the feed nipple 38. This annular rim 60 includes a radially outwardly extending lip 64 thereby to enable the separator chamber to be connected to the feed nipple 38 by means of a conventional V-band clamp 66. The wall 26 of the chamber is also radially outwardly stepped at 67 thereby to permit the extreme end of the feed conduit 38 to fit snugly therein.

Typical forms of combination feed and accept headers are shown in FIGS. 6–9. With reference to FIGS. 6 and 7 it will be seen that the feed and accept header 22a includes a cylindrical outer wall 70 having a divider wall 72 disposed therein thereby to provide for separation between the accept region 74 and the feed region 76. A plurality of tubular accept nipple 36a are connected to the dividing wall 72 in aligned spaced apart relation for fluid flow therethrough with such accept nipple 36a being adapted for connection to the respective end portions 50 of the tubular accept outlets of a series of hydrocyclone separators in the manner illustrated in FIG. 2. A corresponding plurality of tubular feed nipple 38a are provided each surrounding a respective one of the accept nipple 38a in spaced concentric relation therewith, with each feed nipple 38a being connected to the cylindrical outer wall 70 for fluid flow therethrough. The terminal end portions of the feed nipple 38a are provided with annular rim portions 78 adapted to cooperate with the annular rim portions 64 of the hydrocyclone separator described above in connection with FIG. 2 thereby to enable the respective separators to be connected thereto by V-band clamps 66 as described above.

The feed suspension is supplied to the feed region 76 of the header by way of a feed inlet 80 which is also connected to the wall 72, while the accept suspension exits by way of a tubular outlet 82 connected to cylindrical wall 70. It will be appreciated that the assembly shown in FIGS. 6 and 7 can be made of any desired length thereby to accommodate any desired number of hydrocyclones.

The embodiment shown in FIGS. 8 and 9 is very much the same in principle as the embodiment of FIGS. 6 and 7 except that the inner dividing wall is in the form of an elongated pipe 72b of circular cross-section with the outer wall 70b being in the form of a relatively large diameter pipe surrounding the inner pipe 72b. Thus, the feed suspension passes along the annular space provided between the outer pipe 70b and inner pipe 72b. The individual tubular feed nipple 38b are connected in spaced apart relationship to the outer pipe 70b while the individual accept nipple 36b are connected in spaced apart relationship to the inner pipe 72b. One end of the inner pipe 72b is provided with a flanged connection 84 for connection to a suitable accept header (not shown) while the outer pipe 70b is provided with a flanged connection 86 for connection to a suitable feed header (not shown).

The header assembly illustrated in FIG. 1 and referred to previously is very similar to the one shown in FIGS. 6 and 7 except that it makes provision for the connection thereto of two spaced parallel rows of hydrocyclone separators.

By virtue of the above described arrangements, the feed suspension enters the inlet region of the individual hydrocyclones from the feed region of the combined feed-accept header with a relatively low pressure loss due to the relatively large size of the inlet. The combined feed-accept header is sized such that the fluid velocities therein are relatively low and, by virtue of the fact that the feed stock enters the hydrocyclone through the relatively large annular area between the accept nipple 36a and the feed nipple 38a, relatively low fluid velocities are maintained thus resulting in negligible pressure losses since such pressure losses are proportional to the square of the fluid velocity. The friction and shock losses inherent in conventional systems are very significantly reduced when using the apparatus as described above, thus enabling the cleaning systems of the invention to operate at relatively low feed pressures.

Figure 11:
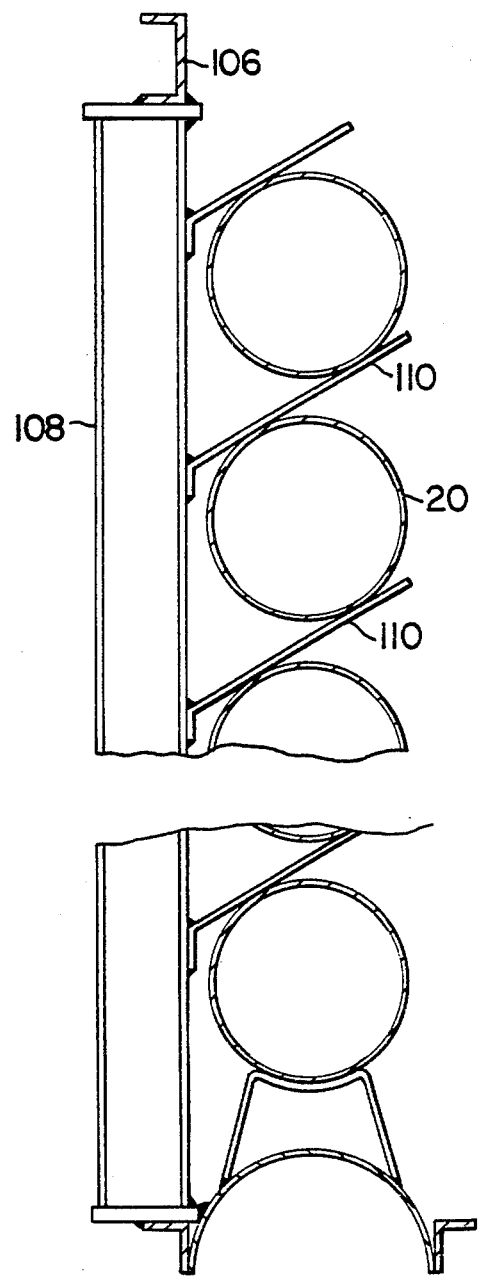
FIG. 11 is a section view taken along line 11—11 of FIG. 10 and looking in the direction of the arrows.

A typical modular pulp stock cleaning system employing a combined feed-accept header arrangement and hydrocyclones according to the present invention is illustrated in FIGS. 10 and 11. The header arrangement 22b is of the type illustrated in FIGS. 8 and 9. It will be seen from FIG. 10 that the feed-accept header 22b is located in a generally upright position but is inclined slightly from the vertical e.g. by an angle of about 5°. Also provided, in spaced parallel relationship to the header 22b, is a reject header 90. A plurality of hydrocyclone separators 20 are connected between the headers 22b and 90 in vertically spaced apart relationship i.e., the separators are disposed one above the other in a generally vertical plane. The longitudinal axes of the hydrocyclone separators 20 are also inclined from the horizontal by about 5° thus allowing suspension to drain therefrom when the equipment is shut down.

The individual separators 20 are connected to the feed-accept header 22b by means of V-band clamps 66 as described above. The opposing reject end portions of the separator are connected to the reject header 90 via a transparent sight glass 92 and a tubular adapter member 94. Thus, the reject flows from the separators 20 can easily be observed.

The above noted assembly is provided with a simple support frame 100 including upright legs 102 connected at their upper ends to horizontally extending frame members 104, the latter being interconnected between the header 22b and the header 90. The upper ends of the above two headers are also interconnected by means of horizontally extending frame members 106. The separators 20 are additionally supported by means of a generally upright frame member 108 extending between frame members 104 and 106, frame member 108 having a series of angularly arranged plates 110 (see FIG. 11) welded thereto in spaced apart relationship with such plates 110 serving to support therebetween the cyclone separators 20. The above noted frame 100 is suitably welded together and is provided with the necessary cross-members, bracing members etc., none of which need to be described here.

The feed-accept header 22b is connected to a pipe 114 which supplies feed stock thereto via a vertically disposed pipe 116 extending upwardly through the floor. A control valve 118 is disposed in the feed line in conventional manner. The accept flow passes outwardly of header 22b via pipe 120 and passes downwardly through a vertical pipe 122 which extends through the equipment floor. A suitable control valve 124 is also provided in this line in conventional fashion. The reject flow from header 90 also passes downwardly through a vertically disposed pipe 126.

In practice, two such modular assemblies as shown in FIG. 10 are placed close together in side-by-side relationship. The amount of floor space occupied by such an arrangement is relatively small and the operator has ready access to the feed and accept control valves 118 and 124 for each assembly. On shut-down of the assembly, both the feed-accept header 22b and the separators 20 have an opportunity to drain completely thus eliminating problems of stock remaining in the system and subsequently drying up thereby producing lumps of stock which can cause a problem later on at start-up.

The system shown in FIGS. 10 and 11 is also very easy to service. The individual hydrocyclone separators 20 are clamped to the header 22b by means of simple V-band clamps 66 which permit the hydrocyclones to be quickly removed for servicing. The structure as a whole is relatively simple in construction and employs a minimum of piping and connections thus making the arrangement less expensive for the manufacturer to build.

Returning now to the hydrocyclone separator per se, Tables 1 and 2 which follow outline test data obtained for a typical hydrocyclone in accordance with the present invention designated by the Model number ELP-440) in comparison with the test data obtained for a conventional hydrocyclone (Model ELP-420), the latter having the same overall dimensions as the ELP-440 Model, but being provided with a conventional single tangential inlet provided in the wall of the hydrocyclone adjacent the large end thereof and being connected to a conventional feed and accept header system.

Figure 5:
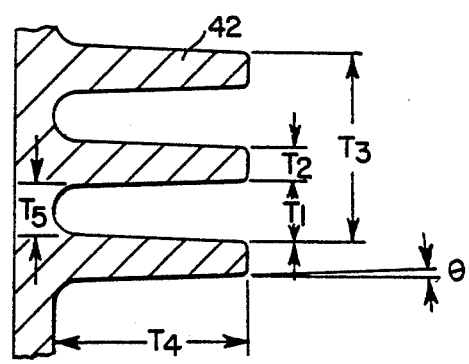
FIG. 5 is a section view illustrating details of the guide vane arrangement in the helical section thereof.

The ELP-440 Model in accordance with the invention had the following dimensions, reference being had to FIGS. 1, 2 and 5:

TABLE OF DIMENSIONS (ELP-440)

(a) Dimensions of Feed and Accept Arrangement
- L1-(guide vane section length)=9.50 in.
- $L_t$=(vane transition section length)=7.00 in.
- $L_h$=(vane helical section length)=2.50 in.
- L2-(accept outlet extension length)=3.00 in. L3-(vortex finder length)=3.00 in.
- D1-(maximum inside diameter of accept)=2.35 in.
- D2-(maximum outside diameter of accept)=3.50 in.
- D3-(Spiral feed vane diameter)=6.00 in. =(inside top cone diameter (D6)
- D4-(minimum inside diameter of vortex finder)=2.00 in.
- D5-(minimum outside diameter of vortex finder)=2.50 in.

(b) Guide Vane Dimensions
- T1-(space at vane edge (helical sect.)=0.55 in.
- T2-(vane thickness at outer edge)=0.30 in.
- T3-(vane lead in helical section)=1.70 in.
- T4-(vane radial width (max.))=1.63 in. (decreases to 1.25 in. at point B)
- T5-(vane root dimension (average)=0.43 in. (in lower helical section only)
- $\theta$-(vane taper angle)=2°
- $\phi$-(angle of guide vane to axis of separator at point B)=10° (this angle increases gradually to about 84° at end of transition section)

(c) Overall Dimensions of Separator
- L4-(length of cylindrical section)=25 ins.
- L5-(length of conical section including tip)=34 ins.
- $\alpha$-(cone included angle)=9°
- D7-(inside diameter of reject outlet tip)=⅝ in. (this may vary depending on circumstances)

The test results are given in the following Tables 1, 2 and 3.

TABLE 1

TEST RESULTS-PROTOTYPE ELP-440

| | | | | | Efficiency 440 vs 420 | | | |
|---|---|---|---|---|---|---|---|---|
| | Tert'y Bleached Softwood Kraft Pulp | | | | Feed Temperature 55° C. | | | |
| Cleaner Model | Test Code No. | Pressures (psig) Feed Acc | | DP F/A | Feed Capacity USGPM | Stock Cods'y %OD Feed | % Reject Rate | Dirt Counts Specks/GM Feed Reject |
| 440 | 1 | 35 | 10 | 25 | 140 | .316 | 29.9 | 13  48 |
| 440 | 2 | 30 | 10 | 20 | 126 | .305 | 30.6 | 10  56 |
| 440 | 3 | 25 | 10 | 15 | 106 | .310 | 32.3 | 10  43 |
| 420 | 8 | 40 | 6 | 34 | 120 | .300 | 28.0 | 9  31 |
| 420 | 9 | 35 | 5½ | 29½ | 114 | .319 | 21.6 | N.M.  N.M. |
| 420 | 10 | 40 | 10 | 30 | 113 | .313 | 60.9 | 10  23 |

TABLE 2

Efficiency 440 vs 420
Primary Unbleached Ammonia-Based Sulphite Pulp Temp = 21° C.
ELP-440 and ELP-420 Tested Simultaneously Compare Tests 1&1, 1A&1A, etc.

| Cleaner Model | Test Code No. | Pressures (psig) Feed Acc | | DP F/A | Feed Capacity USGPM | Stock Cons'y %OD Feed | % Reject Rate | Dirt Removal Efficiency % = $\frac{DF - DA}{DF} \times 100$ |
|---|---|---|---|---|---|---|---|---|
| 440 | 1 | 24 | 10 | 14 | 112.5 | 0.575 | 11.8 | 65 |
| 440 | 2 | 26 | 12 | 14 | 113.5 | 0.423 | 15.7 | 60 |
| 420 | 1 | 34 | 6.5 | 27.5 | 100.9 | 0.575 | 14.4 | 65 |
| 420 | 2 | 34 | 6.5 | 27.5 | 101.8 | 0.423 | 15.3 | 58 |
| 440 | 1A | 24 | 10 | 14 | 113.0 | .578 | 10.9 | 56 |
| 440 | 2A | 20 | 10 | 10 | 96.4 | .597 | 13.4 | 43 |
| 420 | 1A | 34 | 6.5 | 27.5 | 100.4 | .578 | 6.8 | 44 |

TABLE 2-continued

Efficiency 440 vs 420
Primary Unbleached Ammonia-Based Sulphite Pulp   Temp = 21° C.
ELP-440 and ELP-420 Tested Simultaneously Compare Tests 1&1, 1A&1A, etc.

| Cleaner Model | Test Code No. | Pressures (psig) Feed | Acc | DP F/A | Feed Capacity USGPM | Stock Cons'y %OD Feed | % Reject Rate | Dirt Removal Efficiency % = $\frac{DF - DA}{DF} \times 100$ |
|---|---|---|---|---|---|---|---|---|
| 420 | 2A | 34 | 8.5 | 25.5 | 96.9 | .597 | 16.8 | 52 |

TABLE 3

TEST RESULTS - PROTOTYPE ELP-440
Performance ELP 440
Secondary Bleached Hardwood Kraft Pulp   Temperature = 123° F.

| Pressures (psig) | | | Feed Capacity USGPM | Feed Cons'y %OD | % Reject Rate | Dirt Counts (sp/gm) (7 Hand Sheets 1.5 gm ea.) | | Dirt Removal %Eff'y = $\frac{DF - DA}{DF} \times 100$ |
|---|---|---|---|---|---|---|---|---|
| Feed | Acc | $DP_{F/A}$ | | | | Feed DF | Accept DA | |
| 24 | 10 | 14 | 111.6 | 0.68 | 17.8 | 12.89 | 4.11 | 68 |
| 22 | 8 | 14 | 112.5 | 0.71 | 13.5 | 12.56 | 2.46 | 80 |
| 20 | 6 | 14 | 111.9 | 0.72 | 10.6 | 12.00 | 2.81 | 76 |

It will be noted from Tables 1 and 2 that the feed to accept differential pressure required for the ELP-440 in accordance with the invention was only about ½ of the differential required for the ELP-420. At the same time the ELP-440 achieved similar feed capacities and similar dirt removal efficiencies as compared with the ELP-420. Thus, the very significant reduction in differential pressure required by the above cleaner represents a very significant saving in the overall energy used for the cleaning of pulp stock. Similar savings in energy are anticipated in connection with the separating of other types of suspensions.

We claim:

1. A hydrocyclone separator including a body having a wall defining an elongated chamber of generally circular cross-section and shaped such that it decreases in cross-sectional size from a large end to a smaller apex end, a reject outlet at the apex end and an accept outlet at the large end, both being located in axial alignment with said chamber, and means for feeding a liquid suspension generally tangentially into said chamber whereby to form a liquid vortex in said chamber surrounding a central air core extending longitudinally of the chamber, the feeding means including guide vane means defining channel means for the flow of said suspension therethrough, and wherein said accept outlet comprises an elongated tubular member defining an annular region between itself and the wall of said chamber with said guide vane means being located in the annular region and extending between said tubular member and the wall of the chamber such that the channel means has a width determined by the distance from said tubular member to said wall of said chamber throughout the length thereof, said guide vane means defining:

(a) a transition section wherein the guide vane means are disposed at a shallow angle to the longitudinal axis of the chamber at the large end thereof to initially receive the feed suspension in a path of travel directed generally longitudinally of the chamber with such angle gradually increasing so as to gradually swing said suspension from motion in the generally longitudinal direction to motion in the form of a spiral around the longitudinal axis of said chamber, said channel means also being of gradually decreasing cross-sectional area along the length thereof to effect gradual acceleration of the suspension in said transition section, and (b) a helical section of constant lead smoothly connected to said transition section, wherein said channel means defined by the guide vane means in said helical section is of substantially constant cross-sectional area along the length thereof, to cause the accelerated suspension to rotate around the chamber axis to impart centrifugal and shear forces thereto and to effect partial separation of the suspension prior to entry of the suspension into the separation chamber across substantially the full width of the annular region between said tubular member and the wall of the chamber.

2. A hydrocyclone according to claim 1 wherein said guide vane means defines a pair of said channel means for the suspension, the regions where said suspension exits from respective ones of said channel means being spaced apart circumferentially with respect to the wall of said chamber.

3. A hydrocyclone according to claim 1, wherein said helical section of the guide vane means is arranged to rotate the suspension through approximately one full revolution about the chamber axis before the suspension exits from said channel means into the separation chamber.

4. A hydrocyclone according to claim 1 wherein said helical section of the guide vane means is arranged to rotate the suspension through approximately one full revolution about the chamber axis before the suspension exits from the channel means into the separation chamber.

5. A hydrocyclone according to claim 1, wherein said elongated tubular member has a first portion at the one end thereof extending beyond said helical section into said chamber to define a vortex finder and a second portion at the opposite end thereof to provide for a connection to an accept conduit.

6. A hydrocyclone according to claim 1, wherein said wall of the separator chamber terminates at the large end thereof at an annular rim, said annular rim being adapted for connection to a feed conduit, and said elongated tubular accept outlet having an end portion concentrically arranged relative to said annular rim of the separator chamber and adapted for connection to an accept conduit which is concentrically arranged relative to the feed conduit.

7. A hydrocyclone according to claim 1, wherein said guide vane means are integrally formed with said elongated tubular member to define a one-piece unit, the latter being removably supported in said large end of said chamber.

8. A method of separating suspensions in a hydrocyclone separator including a body having a wall defining an elongated chamber of generally circular cross-section and shaped such that it decreases in cross-sectional size from a large end to a smaller apex end with a reject outlet for heavier portions of the suspension at the apex end and a tubular accept outlet for lighter portions of the suspension at the large end, both being located in axial alignment with said chamber, the accept outlet defining an annular region between itself and the chamber wall and having guide vane means in said annular region defining a transition section wherein the guide vane means are initially at a shallow angle to the longitudinal axis of the chamber and a helical section of constant lead smoothly connected to said transition section, the method including feeding a liquid suspension into said chamber whereby to form a liquid vortex in said chamber surrounding a central air core extending longitudinally of the chamber, said step of feeding the liquid suspension including passing the feed suspension into the separator via the full area of the annular region defined between the accept outlet and the chamber wall and in a path of travel initially directed generally longitudinally of the chamber in the transition section and then gradually swinging said suspension from motion in the generally longitudinal direction to motion in the form of a spiral path around the longitudinal axis of the chamber while gradually accelerating the suspension by way of a gradual reduction in the cross-sectional area of the flow path of the suspension along its length as it travels along the transition section, the width of said path being at all times equal to the distance between the tubular accept outlet and the chamber outlet and the chamber wall, and then causing the suspension to enter the helical section and to rotate around the chamber axis while travelling in a flow path of substantially constant cross-sectional area to impart centrifugal forces thereto so as to induce heavier particles in the suspension to move radially outwardly to the wall of the chamber before the suspension enters into the separation chamber and feeding the suspension generally tangentially into the separation chamber in a path whose width is defined by the distance between said tubular accept outlet and the chamber wall.

9. The method according to claim 8 wherein said accelerated and rotating feed suspension is introduced into the separation chamber at a pair of locations spaced apart circumferentially of said chamber.

* * * * *